United States Patent
Hammerschmidt

(10) Patent No.: US 10,601,127 B2
(45) Date of Patent: Mar. 24, 2020

(54) CONNECTOR FOR DIELECTRIC WAVEGUIDES

(71) Applicant: Infineon Technologies AG, Neubiberg (DE)

(72) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 279 days.

(21) Appl. No.: 15/096,961

(22) Filed: Apr. 12, 2016

(65) Prior Publication Data

US 2016/0308266 A1    Oct. 20, 2016

(30) Foreign Application Priority Data

Apr. 14, 2015   (DE) .................. 10 2015 105 657

(51) Int. Cl.
*H01Q 1/50* (2006.01)
*H01P 5/08* (2006.01)
*G02B 1/04* (2006.01)

(52) U.S. Cl.
CPC .............. *H01Q 1/50* (2013.01); *G02B 1/045* (2013.01); *H01P 5/08* (2013.01); *H01P 5/087* (2013.01)

(58) Field of Classification Search
None
See application file for complete search history.

(56) References Cited

U.S. PATENT DOCUMENTS

| | | | |
|---|---|---|---|
| 8,406,830 B2 * | 3/2013 | Sakurai | H01P 3/122 343/906 |
| 9,867,291 B2 * | 1/2018 | Roberts | H05K 1/14 |
| 2013/0109317 A1 * | 5/2013 | Kikuchi | H04B 7/24 455/41.2 |
| 2014/0285293 A1 * | 9/2014 | Schuppener | H01P 3/16 333/254 |
| 2015/0372388 A1 * | 12/2015 | Martineau | H01Q 13/06 343/785 |
| 2015/0372439 A1 * | 12/2015 | Sullivan | H01R 43/28 439/676 |
| 2017/0271777 A1 * | 9/2017 | Martineau | H01Q 13/06 |

* cited by examiner

*Primary Examiner* — Trinh V Dinh

(74) *Attorney, Agent, or Firm* — Schiff Hardin LLP

(57) ABSTRACT

Embodiments described herein relate to a connector for a dielectric waveguide. In accordance with one embodiment, the connector includes a connector housing that forms a receptacle operably receiving the dielectric waveguide through an opening in the housing. Furthermore, the connector includes an antenna coupled to the connector housing and electromagnetically coupled to the dielectric waveguide when inserted in the opening of the connector housing.

30 Claims, 4 Drawing Sheets

CONNECTOR FOR DIELECTRIC WAVEGUIDES

TECHNICAL FIELD

The present relates to the field of radio frequency (RF) plastic wave-guides, in particular to connectors for coupling RF plastic waveguides to respective antennas.

BACKGROUND

Modern chip manufacturing technologies allow comparably high carrier frequencies in wired and wireless communication systems to achieve data rates in rage of several gigabits per second. One promising data transmission technology is based on propagation of millimeter waves through plastic waveguides. Similar to fibers used for optical data transmission, plastic fibers may provide a low-loss transmission channel for millimeter waves, i.e. radio frequency (RF) signals in the range of approximately 100 to 200 GHz (corresponds to a wavelength of approximately 1.5 to 3 mm). Different from optical data transmissions systems, transmission systems using millimeter waves allow, however, more complex signal modulation schemes such as, for example, phase shift keying (PSK), frequency shift keying (FSK), quadrature amplitude modulation (QAM), etc. AS the electromagnetic wave is confined to the dielectric waveguide, signal loss due to wave propagation in free space is eliminated, which results in a high signal-to-noise ratio (SNR) at the receiver. Moreover, RF waveguides may be made of comparably cheap plastic materials such as polypropylene (PP), polystyrene (PS) or polyethylene (PE). The RF transmitters and receivers may be manufactured in standard CMOS technology without the need for electro-optical converters (light emitting diodes and photo diodes).

A RF plastic waveguide link is composed of a transmitter chip, the dielectric waveguide, and the receiver chip. Alternatively, combined transmitter/receiver chips (transceiver chips) may be used. The respective antennas may be integrated in the chip or formed off-chip on a separate substrate. In many applications (e.g. in the automotive sector) reliable and easy-to-handle connectors for coupling antenna and waveguide are of paramount importance. Thus there is a general need for connectors suitable for the mentioned transmission technology using millimeter waves propagating through plastic waveguides.

SUMMARY

Embodiments described herein relate to a connector for a dielectric waveguide. In accordance with one embodiment, the connector includes a connector housing that forms a receptacle operably receiving the dielectric waveguide through an opening in the housing. Furthermore, the connector includes an antenna coupled to the connector housing and electromagnetically coupled to the dielectric waveguide when inserted in the opening of the connector housing.

Some embodiments described herein relate to a device for coupling a dielectric waveguide. In accordance with one embodiment, the device includes an RF frontend circuit, which is integrated in a chip package and configured to generate and/or receive an RF signal. Furthermore, the device includes a connector housing, which forms a receptacle operably receiving the dielectric waveguide through an opening in the housing, and an antenna coupled to the RF frontend circuit.

Other embodiments described herein relate to a connector system for a dielectric waveguide. In accordance with one example, the connector system comprises a plug, which is arranged at an end-portion of a dielectric waveguide, and a connector housing, which forms a receptacle configured to receive the plug with the dielectric waveguide through an opening in the connector housing. An antenna is coupled to the connector housing and configured to radiate an electric RF signal, as electromagnetic signal, towards the end-portion of the dielectric waveguide and/or configured to convert an electromagnetic signal received from the dielectric waveguide to an electric RF signal.

BRIEF DESCRIPTION OF THE DRAWINGS

The invention can be better understood with reference to the following description and drawings. The components in the figures are not necessarily to scale, emphasis instead being placed upon illustrating the principles of the invention. Moreover, in the figures, like reference numerals designate corresponding parts. In the drawings.

DETAILED DESCRIPTION

In the field of opto-electronics and optical communication optical waveguides (optical fibers) are commonly used. However, communication by transmission millimeter waves through dielectric waveguides (which are not necessarily transparent for light) is a comparably new technology which is not yet applied in industrial or consumer products. Different from optical communication systems, communication systems that use millimeter waves allow, however, more complex signal modulation schemes such as BPSK, QPSK, FSK, QAM, etc. Even more important, the RF transmitters and receivers may be manufactured standard semiconductor technologies (e.g. CMOS technologies) without the need for electro-optical converters such as light emitting diodes and photo diodes. As compared to optical communication systems, the electro-optical converters can simply be replaced by antennas, i.e. by a short line of conductive material (e.g. a strip line).

Figure 1:
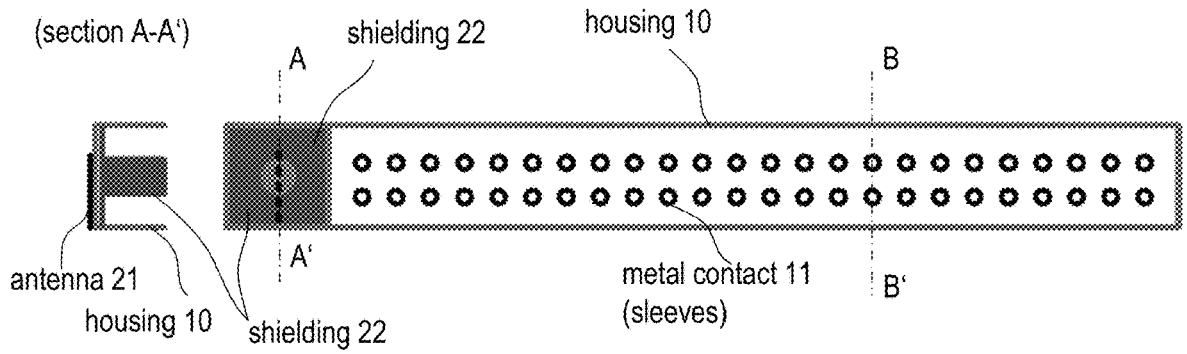
FIG. 1 illustrates one example of a connector including a portion with conventional metal contacts and a portion which forms an interface to a plastic waveguide.

FIG. 1 includes a front view illustrating one exemplary connector, which is composed of a portion (right portion) including conventional metal contacts and a portion (left portion) forming an interface with a dielectric waveguide. Additionally, a cross section through the portion forming an interface with the dielectric waveguide is shown. Generally, the connector includes a connector housing 10, which forms a receptacle for the dielectric waveguide (e.g. a plastic fiber) through an opening in the connector housing 10. That is, the front side of the connector housing 10 is open and, thus, a plug carrying an end portion of the dielectric waveguide can be inserted in (plugged into) the connector housing 10. A portion of the connector housing 10 may include metal contacts 11 as used in standard wire-to-board or board-to-board connectors.

An antenna 21 is coupled to the connector housing. In the present example, the antenna 21 is attached to the outer surface of the rear wall or the connector housing 10. The antenna 21 receives the electric RF signal and radiates a corresponding electromagnetic signal towards the opening in the connector housing 10, through which the dielectric waveguide is inserted. Due to the short distance between the antenna 21 and the dielectric waveguide (when inserted in the connector housing 10), a significant fraction of the electromagnetic RF signal radiated by the antenna is coupled into the dielectric waveguide. The electromagnetic signal can then propagated through the waveguide. Similarly, an electromagnetic signal incident through the dielectric waveguide can be received by the antenna 21 and converted to a corresponding electric RF signal. The losses are low due to the proximity between antenna 21 and dielectric waveguide. In order to further improve the electromagnetic coupling between the antenna 21 and the waveguide (when inserted in the connector housing 10) a shielding 22 may be provided. Different examples of the shielding 22 are discussed later with reference to FIGS. 5 and 6.

Figure 2:
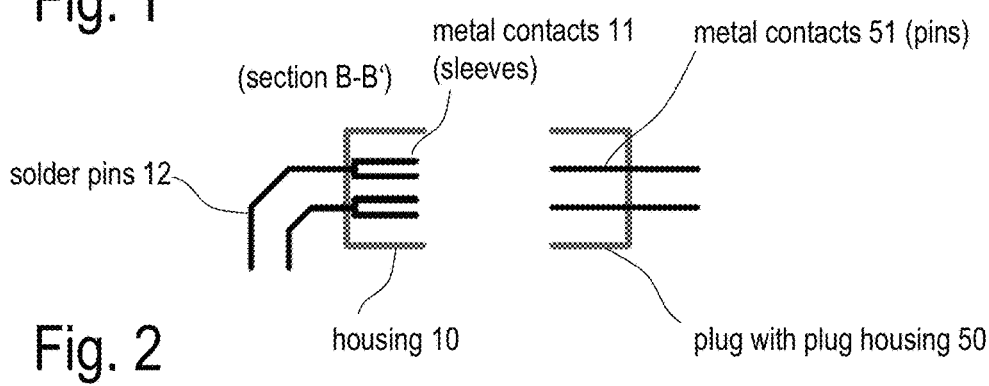
FIG. 2 illustrates a cross section through the connector of FIG. 1, the cross section showing the conventional metal contacts.

The left part of FIG. 2 is a cross-sectional view through that portion of the connector of FIG. 1, which includes the conventional metal contacts 11 (e.g. sleeves or spring contacts). The right part of FIG. 2 is a cross-sectional view of a corresponding plug with a plug housing 50 and metal contacts 51 (e.g. pins). The metal contacts 11 and 51 may, however, have any suitable geometry, for example, a geometry as used in the Milli-Grid™ connectors of Molex. In some applications it may be desirable to have a single connector for galvanic contacts (e.g. to connect copper cables) and for the dielectric waveguide described herein. However, in some applications separate connectors may be desirable to have separate connectors for the galvanic contacts and the waveguide. Most of the exemplary embodiments described with respect to FIGS. 3 to 11 include only connector for the dielectric waveguide. Of course, any of these embodiments can be combined with conventional galvanic contacts as shown in FIG. 1.

Figure 3:
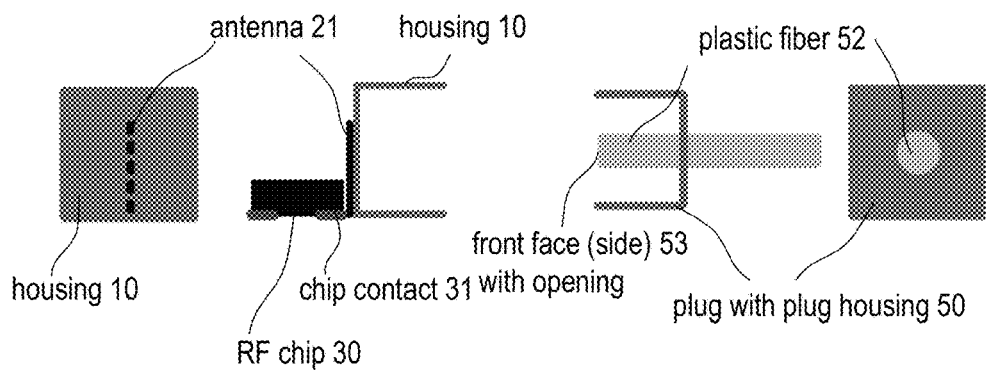
FIG. 3 illustrates an exemplary connector system including a connector which forms a receptacle for interfacing with a plastic wave guide and a corresponding plug arranged at an end portion of the plastic wave guide; an antenna is applied to the back side of the receptacle.
Figure 4:
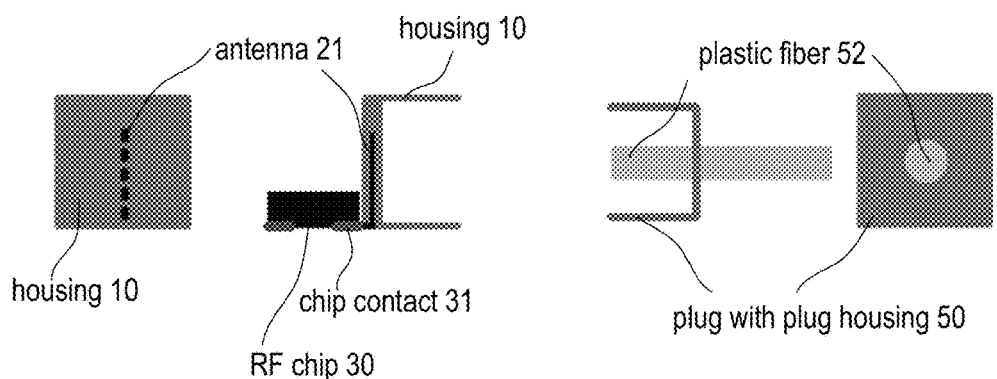
FIG. 4 illustrates an alternative to the example of FIG. 3, wherein the antenna is embedded in a connector housing.
Figure 5:
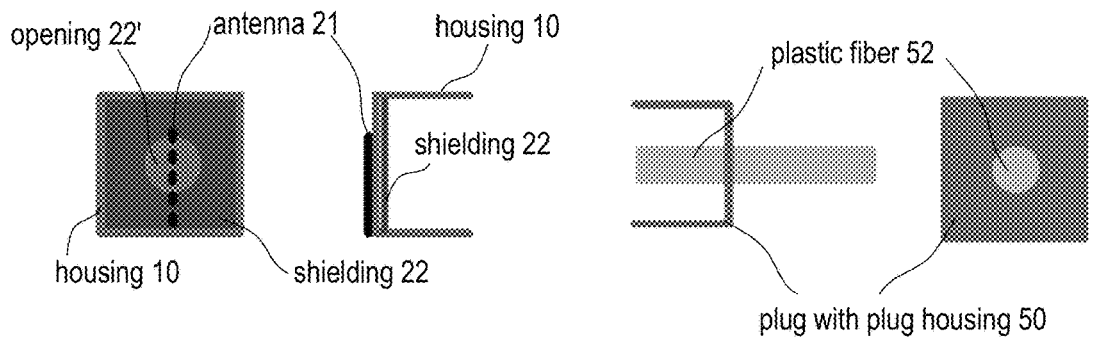
FIG. 5 illustrates a connector system similar to the system of FIG. 3 but with an additional shielding applied in the connector housing to shield RF radiation.

Each of the FIGS. 3, 4, and 5 includes front and cross-sectional view of a connector (left part of the figures), which provides a mechanical and an electromagnetic interface for coupling a dielectric waveguide, and a corresponding plug (right part of the figures), which is arranged at an end portion of the dielectric waveguide. In the following the dielectric waveguide is also referred to as plastic fiber. The connector may be attached to a printed circuit board (not shown) or to any other supporting plate. However, in electronic control units (ECUs) as used, for example in an automobile, the connector will be mounted to a printed circuit board together with other electronic components to form a compact module. The connector may allow to establish a communication link between two or more modules (ECUs) via a dielectric waveguide (plastic fiber). It should be note that more than one dielectric waveguides may be electromagnetically connected to respective antennas within one connector housing. The connector housing 10 may include an opening 10' for each dielectric waveguides to be coupled.

The first and the second view (from left to right) of FIG. 3 are a front view and cross-sectional view of one exemplary connector for coupling an RF signal (as electromagnetic wave/signal) into a plastic fiber, which acts as a dielectric waveguide and may be made of plastic materials such as PE, PP, PS or the like. The third and the fourth view (from left to right) of FIG. 3 are a front view and cross-sectional view of a corresponding plug, which carries an end portion of the plastic fiber. The connector includes a connector housing 10, which may be manufactured by injection molding of, for example, a suitable thermoplastic material. The connector housing 10 may have the form of a rectangular cuboid wherein a front side of the connector housing 10 is open such that a plug (plug housing 50) with a plastic fiber 51 can be inserted. In the example of FIG. 3 an antenna 21 is attached to a back side of a rear wall (i.e. opposing the front side through which the plastic fiber may be inserted) of the connector housing 10. The antenna 21 may be a short strip line applied (e.g. using a printing technique or glueing) to the surface of the connector housing 10. As the wavelength of the RF signal, which is to be transmitted or received by the antenna 21, is in the range of a few millimeters, the antenna 21 may be a straight line of less than a millimeter. For example, for a wavelength of 3 mm (corresponds to a carrier frequency of 100 GHz) an antenna of 0.75 mm length (corresponds to a quarter wavelength) may be sufficient. In the present example, the antenna 21 may be electrically connected to a chip contact 31 of a semiconductor chip 30, which may include, inter alia, an RF frontend circuit of an RF transceiver. The RF frontend circuit generates the RF signal to be transmitted by the antenna 21 and processes the RF signal received by the antenna 21. Although not explicitly shown in FIG. 3, the chip 30 and the connector housing 10 may be attached to a circuit board or any other supporting plate. The plug housing 50 of the plug carries an end portion of the plastic fiber 52 and has a shape that fits into the connector housing 10 and holds an end portion of the plastic fiber at a defined position close to the antenna 21, so that a front face 53 of the plastic fiber 52 points towards the antenna 21. Clamps or snap-in connectors may be used to hold the plug in the connector housing.

Similar to FIG. 3, the first and the second views of FIGS. 4 and 5 are front and cross-sectional views of the connector whereas the third and the fourth view are front and cross-sectional views of the corresponding plug including the plastic fiber. The example of FIG. 4 is essentially the same as the example of FIG. 3. The only difference is, however, that, according to FIG. 4, the antenna 21 is embedded in the rear wall of the connector housing 10 instead of attached to its surface. Such embedding may be accomplished by inserting the antenna in the mold during the injection mold process used for manufacturing the connector housing 10. The example of FIG. 5 is also very similar to the previous example of FIG. 3. As compared to the example of FIG. 3 the example of FIG. 5 additionally has a shielding 22 attached to the front side of the rear wall of the connector housing 10. As can be seen in the front view (first view from left) the shielding 22 has an opening 22' in the center, so that electromagnetic radiation can pass through the opening 22' in the shielding from the antenna 21 to the plastic fiber (if plugged in) and vice versa. The inner diameter of the opening 22' may be approximately the same as the outer diameter of the plastic fiber. The chip 30 has been omitted in FIG. 5 for the sake of simplicity.

Figure 6:
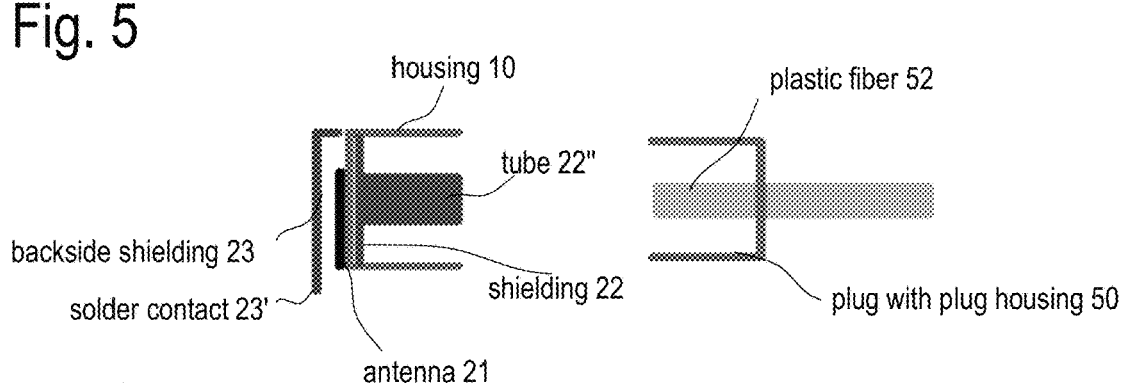
FIG. 6 illustrates a connector system similar to the system of FIG. 5, wherein the shielding includes a tubular member arranged in the connector housing such that the plastic waveguide is accommodated in the tubular member when the plug is plugged into the connector housing.

FIG. 6 illustrates a further example, which is essentially the same as the previous example of FIG. 5 but with a different, more complex shielding 22. The left view of FIG. 6 is a cross-sectional view of the connector, whereas the right view is a cross-sectional view of the corresponding plug. Like in the previous example, the shielding 22 is attached to the inner surface of the rear wall of the connector housing 10, and the shielding includes an opening 22' (not visible in FIG. 6, see FIG. 5) through which electromagnetic radiation may pass. The opening 22' is encompassed by a hollow tubular member 22" which is made of metal and mechanically and electrically connected to the shielding. The tubular member 22" of the shielding 22 is arranged such that the end portion of the fiber is accommodated in the interior of the tubular member 22", when the plug carrying the plastic fiber 52 is inserted in the connector housing 10. Therefore a longitudinal axis of the end portion of the plastic fiber approximately coincides with the longitudinal axis of the tubular member 22". Generally, the shielding 22 can reduce the amount of radiation leaking from the connector housing and may potentially disturb the function of neighboring electronic components. In addition to its function as a shielding, the tubular member 22" may improve the mechanic stability and ensure a precise positioning of the end portion of the plastic fiber 52 relative to the antenna 21. To further improve the electromagnetic shielding an additional shielding 23 (rear side shielding) may be arranged such that the antenna 21 resides between the shielding 22 arranged in the interior of the connector housing 10 and the shielding 23. The additional shielding may be attached to the connector housing 10. Furthermore, it may have a solder contact 23', which may be soldered to the same circuit board, to which the connector housing 10 is attached. Antenna 21 and the rear side shielding 23 may be mechanically connected (but electrically isolated from each other) to form one structural component. The rear side shielding 23 may also function as a reflector for electromagnetic radiation generated by the antenna 21. That is, the shielding 23 may be a reflector configured to reflect radiation, which propagates away from the opening in the connector housing, back towards the opening in the connector housing (where die plastic fiber is inserted). The reflector may be shaped such that the reflected radiation is focused into the dielectric waveguide when inserted in the opening in the connector housing.

Figure 7:
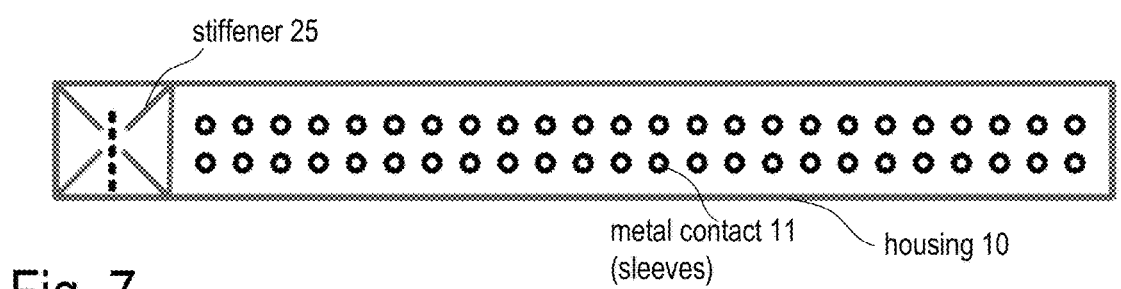
FIG. 7 illustrates a connector similar to the connector of FIG. 1, wherein the portion of the connector housing, which receives the plug with the plastic waveguide, includes stiffeners in arranged diagonally in the interior of the connector housing.
Figure 8:
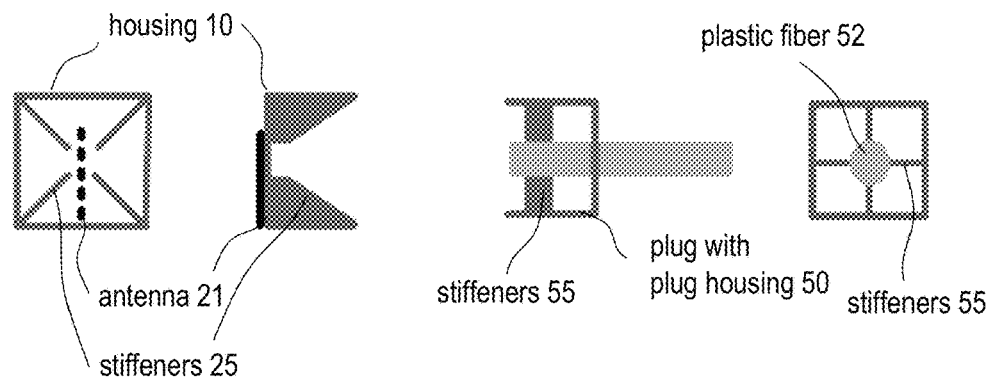
FIG. 8 illustrates front and cross-sectional view of the connector of FIG. 7 (only the portion interfacing with the waveguide) and a corresponding plug carrying the waveguide; the plug housing including stiffeners arranged vertically and horizontally so that they can mate with the stiffeners of the connector housing.

To improve mechanical stability of the connector housing 10 and to provide a precise positioning of the plastic fiber 52 relative to the antenna 21, the connector housing 10 may include stiffeners, which have the form of flat bars or plates as shown in the example of FIGS. 7 and 8. FIG. 7 is a front view of a large connector including galvanic contacts (right portion of the connector) and an interface for coupling an RF signal into a plastic fiber (left portion of the connector) analogously to the example of FIG. 1. In the present example, the stiffeners 25 extend diagonally from the corners to the center of that portion of the connector housing, which receives the plug with the plastic fiber. The first view from the left of FIG. 8 shows the same situation; the second view of FIG. 8 is the corresponding cross-sectional view of the connector. In the cross-sectional view, the stiffeners have a substantially triangular form to keep the area of contact between the stiffeners 25 and the plastic fiber small in order to avoid leakage of radiation from the fiber into the stiffeners. Leakage may occur as the plastic fiber 52 and the stiffeners 25 may have a permittivity similar to the permittivity of the plastic fiber 52. The third and the fourth view of FIG. 8 are cross-sectional and front view of the corresponding plug, which may also have stiffeners 55 extending from the inner surfaces of the plug housing 50 to the circumferential surface of the plastic fiber 52. In the present example, the stiffeners 25 in the connector housing 10 are arranged diagonally whereas the stiffeners 55 in the plug housing are arranged vertically and horizontally so that plug fits in the connector housing 10 with the stiffeners 25 and 55 arranged alternatingly around the longitudinal axis of the plastic fiber, when the plug is plugged into the connector housing. Similar as in the previous examples of FIGS. 3, 5, and 6, the antenna is attached at the back side of the connector housing 10.

Figure 9:
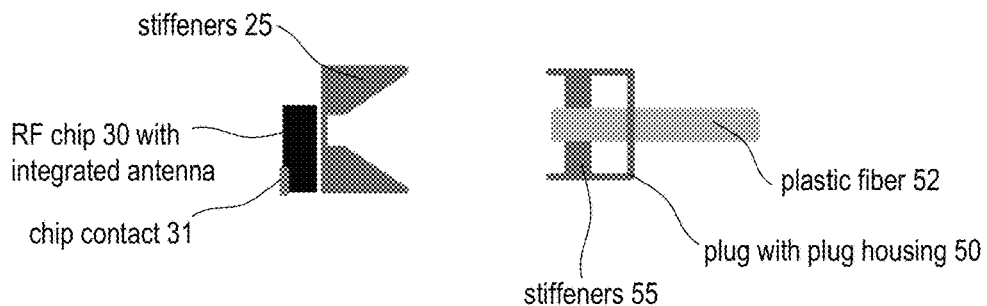
FIG. 9 illustrates an example similar to the example of FIG. 8, wherein the antenna is integrated in a chip package which also includes a RF frontend circuit; the chip package being arranged close to the back side of the connector housing.
Figure 10:
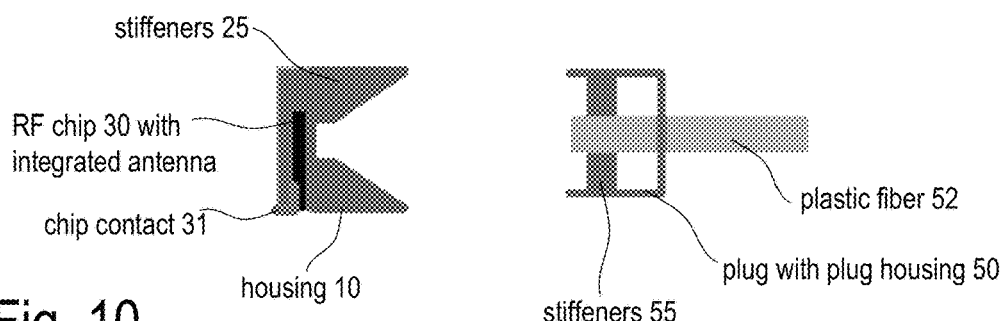
FIG. 10 illustrates an alternative to the example of FIG. 9, wherein the chip including the RF frontend circuit as well as the antenna are embedded in the rear wall of the connector housing.

In the previous examples, the antenna has been attached to or embedded in the connector housing 10 separately from the chip 30 (see FIGS. 3 and 4), in which the RF frontend circuit resides. However, as the size of the antenna may be small, it can be integrated on the semiconductor chip or in the same chip package as the semiconductor chip 30. In the example of FIG. 9, the antenna is not directly attached to the connector housing 10 but the semiconductor chip 30 including the antenna 21 is attached to the connector housing 10. Alternatively, the chip 30 including the antenna may be attached to the same circuit board as the connector directly adjoining or at a small distance adjacent to the connector housing as shown in FIG. 9 (left view). During operation the electromagnetic (RF) signal emanating from the antenna included in the chip 30 passes through the rear wall of the connector housing 10 and is coupled in the plastic fiber 52 or vice versa. In the present example, the connector housing 10 and the plug (plug housing 50, stiffeners 55, plastic fiber 52) is essentially designed in the same way as in the previous example of FIG. 8. FIG. 10 is another example which differs from FIG. 9 in that the chip 30 including the antenna is embedded in the rear wall of the connector housing 10. For example, the chip 30 may be inserted in the mold during injection molding of the connector housing 10. The chip contacts 31 are led through the bottom surface of the housing 10 to allow to electrically connect the chip 30, e.g. with corresponding solder pads arranged on a circuit board (not shown).

Figure 11:
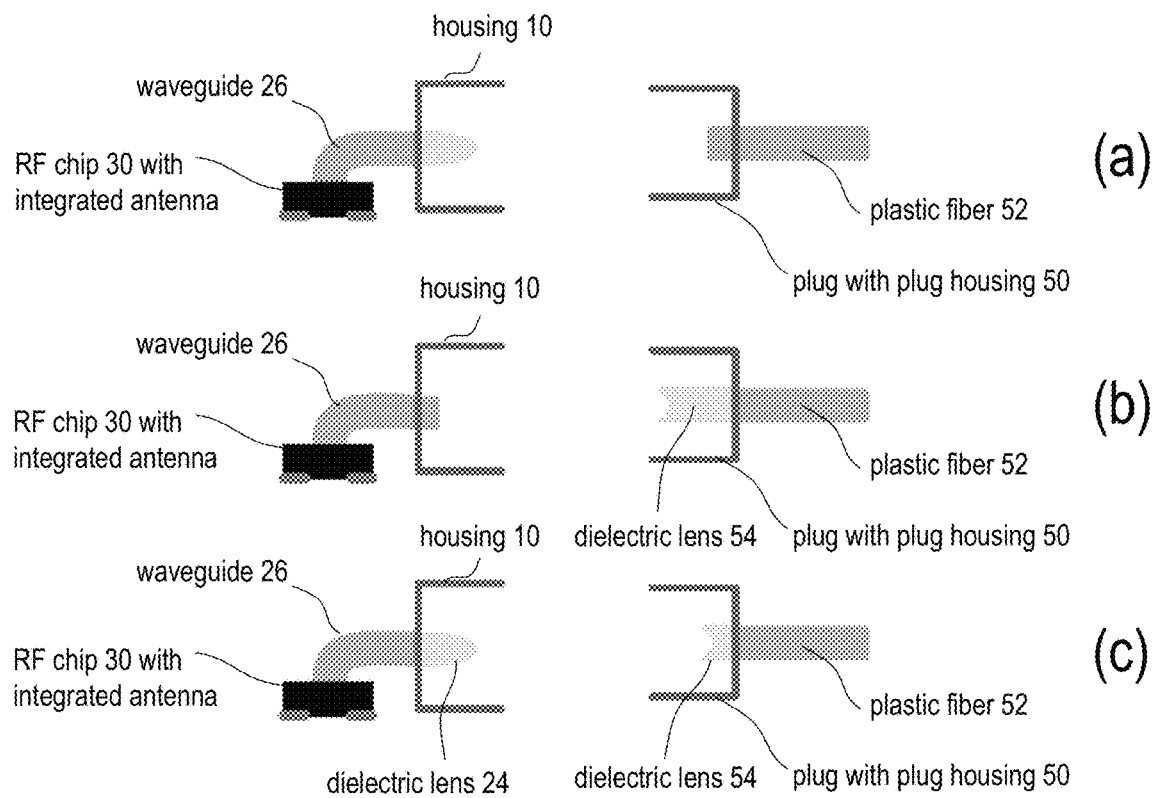
FIG. 11 illustrates a further exemplary connectors and corresponding plugs, wherein the connectors each include a further waveguide for interfacing with the plastic waveguide and configured to guide the electromagnetic RF signal radiated from an antenna integrated in a chip package to the connector.

FIG. 11 illustrated three very similar examples, in which the chip 30 including the RF frontend circuit as well as an integrated antenna is mounted at a circuit board spaced apart from the connector housing 10. A further waveguide 26 is used to guide the electromagnetic radiation from the integrated antenna in the chip 30 into the connector housing 30. The waveguide 26 may end at the back side of the connector housing or be fed through the rear wall of the connector housing into the interior of the connector housing 10. To collect the electromagnetic wave emanating from the further waveguide 26 into the connector housing 10 (and vice versa) a dielectric lens may be used. The dielectric lens may be arranged in the connector housing 10 at the end of the further wave guide 26 (see FIG. 10a, dielectric lens 24) or in the plug housing 50 at the end of the plastic fiber 52 (FIG. 10b, dielectric les 54). A combination of both may also be applicable (FIG. 10c, dielectric lenses 24 and 54). Except the coupling of the integrated antenna to the connector housing 10 using the further waveguide 26, the present example is very similar to the examples previously described herein. The further waveguide 26 may be a plastic fiber as the dielectric waveguide 52. However, different types of waveguides may be used such as a hollow metallic waveguide.

Figure 12:
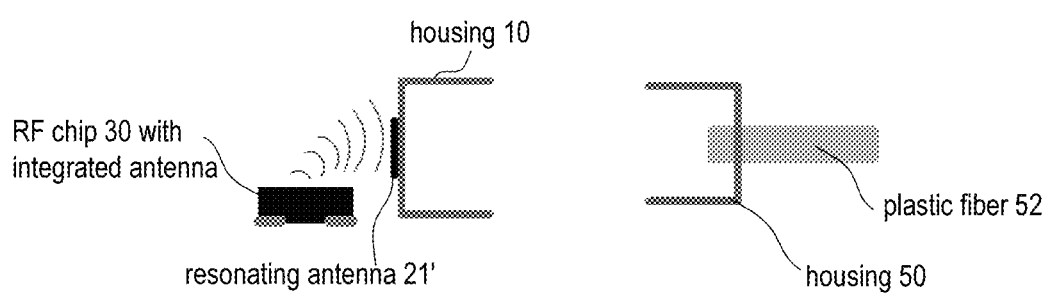
FIG. 12 illustrates an further example of a connector, wherein the connector has a resonating antenna attached thereto for receiving the RF signal radiated from a chip with an integrated antenna and directing the radiation towards the dielectric waveguide.

FIG. 12 illustrates an example similar to the example of FIG. 11. However, the further waveguide 26 can be omitted. Instead, the electromagnetic signal radiated from the antenna included in the chip 30 propagates through the space (through air) and is received by a resonating antenna 21' attached to the back side of the connector housing 10 (similar as antenna 21 in FIG. 3 but without a galvanic connection to the chip). The resonating antenna 21' is configured to receive the electromagnetic signal radiated from the chip 30 and directs it towards the plastic fiber 52 (and vice versa).

Finally it should be noted, that technical features described above with respect to a specific example can also applied to other embodiments unless explicitly excluded by the description. For examples, the stiffeners described in the context of FIGS. 7 and 8 may be implemented any other embodiment described herein. Similarly, the shielding 22, particularly the tubular member 22" of the shielding 22 as well as the rear side shielding 23 illustrated in FIG. 6 may be readily applied any other embodiment, etc.

Furthermore, it should be noted that the RF link implemented using dielectric waveguides and connectors in accordance with the embodiments described herein may be used to communicate data unidirectionally and bidirectionally either in half-duplex or in full-duplex mode. That is, the antenna coupled to the connector housing as described with regard to various embodiments may be used to radiate an electric RF signal (e.g. provided by an RF frontend circuit) as electromagnetic signal, which is coupled into the dielectric waveguide. Alternatively or simultaneously the antenna may be used to receive an electromagnetic wave from the dielectric waveguide, convert the electromagnetic signal into an electric RF signal to be further processed (e.g. amplified, filtered, de-modulated, digitized, etc.), for example, by the RF frontend circuit arranged in the RF chip mentioned with regard to various embodiments. The same antenna may be used for radiating and receiving the electromagnetic signal. However, separate receive and transmit antennas may be used instead. Finally, more than one dielectric waveguides may be electromagnetically connected to respective antennas within one connector housing. Additional, metal contacts may be provided in the connector housing as mentioned with regard to various embodiments.

While various embodiments of the invention have been described, it will be apparent to those of ordinary skill in the art that many more embodiments and implementations are possible within the scope of the invention. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

The invention claimed is:

1. A connector for a dielectric waveguide, comprising:
   a connector housing forming a receptacle to operably receive the dielectric waveguide at a front side such that an end portion of the dielectric waveguide passes through an opening in a rear wall at a rear side of the connector housing located opposite the front side, wherein the dielectric waveguide is configured to transit millimeter waves; and
   an antenna coupled to or embedded in an outer surface of the rear wall of the connector housing, and electromagnetically coupled to the dielectric waveguide when the dielectric waveguide is received in the connector housing, wherein the antenna is included in a chip package that is attached directly to the connector housing.

2. The connector according to claim 1, wherein the antenna is configured to:
   radiate an RF signal, as electromagnetic signal, towards the opening in the connector housing; and/or
   convert an electromagnetic signal received from the dielectric waveguide when inserted in the opening in the connector housing into a corresponding RF signal.

3. The connector according to claim 1,
   wherein the connector housing is made of plastic and the antenna is molded in the connector housing.

4. The connector according to claim 1,
   wherein a shielding is attached to a front side of a rear wall of the connector housing, the shielding being made of metal to shield electromagnetic radiation.

5. The connector according to claim 4,
   wherein the shielding has an opening, which is arranged such that the RF signal is radiated from the antenna through the opening of the shielding.

6. The connector according to claim 4,
   wherein the shielding comprises a metal sleeve attached to a the front side of the rear wall of the connector housing, the metal sleeve operably receiving an end-portion of the dielectric waveguide.

7. The connector according to claim 1,
   wherein a shielding is attached to the connector housing, the shielding being made of metal to shield electromagnetic radiation, and the shielding being arranged to shield radiation from the antenna in a direction away from the dielectric waveguide.

8. The connector according to claim 1,
   wherein a reflector is attached to the connector housing and configured to reflect radiation, which propagates away from the opening in the connector housing, back towards the opening in the connector housing.

9. The connector according to claim 8,
wherein the reflector is formed such that the reflected radiation is focused into the dielectric waveguide when inserted in the opening in the connector housing.

10. The connector according to claim 1,
wherein the connector housing is made of plastic and the antenna is molded in the connector housing together with an RF semiconductor chip that includes an RF frontend circuit for generating or receiving the RF signal.

11. The connector according to claim 1,
wherein the connector housing comprises stiffeners, which are arranged in the interior of the connector housing and are attached to inner surfaces of the connector housing.

12. The connector according to claim 1,
wherein the antenna is mechanically attached to the connector housing.

13. The connector according to claim 1, further comprising:
a further waveguide arranged to guide the RF signal radiated from the antenna towards the connector housing.

14. The connector according to claim 13,
wherein the further waveguide is a plastic fiber or a hollow waveguide or an RF coaxial cable.

15. The device according to claim 14, further comprising:
a circuit board carrying the connector housing.

16. The device according to claim 13,
wherein the chip package is attached to the circuit board and electrically connected to the antenna.

17. The device according to claim 13,
wherein the antenna is integrated in the chip package, and wherein the chip package is attached to the circuit board.

18. The device of claim 17,
wherein the antenna integrated in the chip package is coupled to the connector housing by a further waveguide.

19. The connector according to claim 13,
wherein the antenna is integrated in a chip package spaced apart from the connector housing.

20. The connector according to claim 1, wherein the connector housing includes at least one further opening for receiving at least one further dielectric waveguide.

21. The connector according to claim 1, wherein the connector housing includes at least one metal contact.

22. A connector system, comprising:
a plug arranged at an end-portion of a dielectric waveguide which is configured to transit millimeter waves;
a connector housing forming a receptacle configured to receive the plug with the dielectric waveguide at a front side such that an end portion of the dielectric waveguide passes through an opening in a rear wall at a rear side of the connector housing located opposite the front side; and
an antenna coupled to or embedded in an outer surface of the rear wall of the connector housing, and configured to: radiate an electric RF signal, as electromagnetic signal, towards the dielectric waveguide and/or configured to convert an electromagnetic signal received from the dielectric waveguide to an electric RF signal, wherein the antenna is included in a chin package that is attached directly to the connector housing.

23. The connector system according to claim 22, further comprising:
a circuit board carrying the connector housing.

24. The connector system according to claim 23, further comprising:
an RF frontend circuit arranged in a chip package, the RF frontend circuit being configured to generate the RF signal.

25. The connector system according to claim 24,
wherein the antenna is attached to or embedded in the connector housing.

26. The connector system according to claim 24,
wherein the antenna is integrated in the chip package.

27. The connector system according to claim 26,
wherein the chip package is attached to or embedded in the connector housing.

28. The connector system according to claim 26,
wherein the chip package is attached to the circuit board, and
wherein the system comprises a further waveguide that guides the electromagnetic signal radiated by the antenna towards the connector housing for coupling the electromagnetic signal into the dielectric waveguide.

29. The connector system according to claim 26,
wherein the chip package is attached to the circuit board, and
wherein the system comprises a further waveguide that guides the electromagnetic signal received from the dielectric waveguide towards the antenna.

30. The connector system according to claim 28,
wherein the dielectric waveguide and the further waveguide meet at an interface in the connector housing, the interface including at least one dielectric lens.

* * * * *